Nov. 3, 1936.   W. J. McLACHLAN   2,059,885
SYSTEM OF ELECTRIC DISTRIBUTION
Filed Oct. 10, 1934
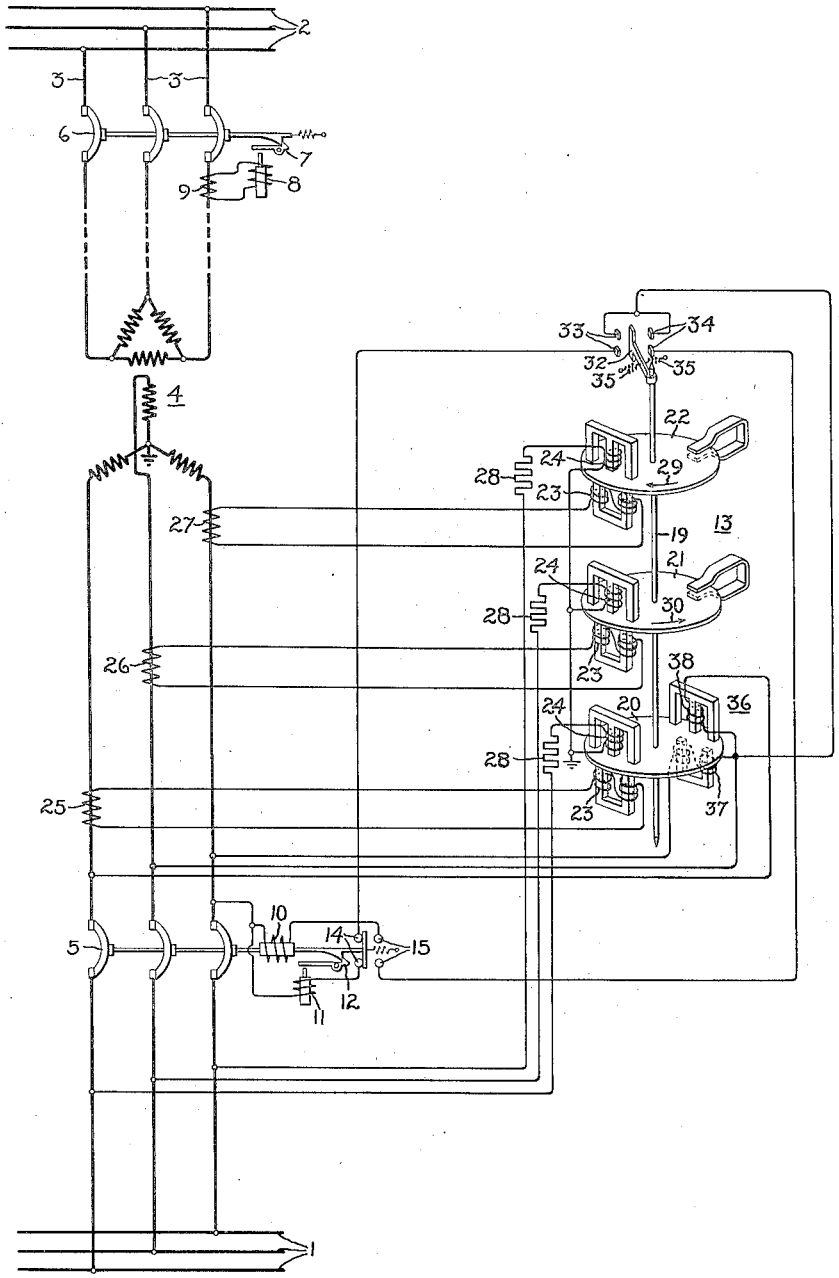
Inventor:
Willard J. McLachlan
by Harry E. Dunham
His Attorney.

Patented Nov. 3, 1936

2,059,885

UNITED STATES PATENT OFFICE 2,059,885

SYSTEM OF ELECTRIC DISTRIBUTION

Willard J. McLachlan, Scotia, N. Y., assignor to General Electric Company, a corporation of New York Application October 10, 1934, Serial No. 747,743

6 Claims. (Cl. 175—294)

My invention relates to systems of electric distribution and particularly to alternating current network systems in which an alternating current network is supplied with current at a plurality of points by means of feeder circuits fed from the same or different sources of current. In such systems it is sometimes desirable that the network circuit breaker, which connects a feeder circuit to the network, shall automatically open only in response to a predetermined value of power flowing from the network to the feeder circuit, which value varies with the circuit voltage, and shall automatically close when the feeder circuit voltage exceeds a predetermined value.

One object of my invention is to provide an improved arrangement for accomplishing this result. In accordance with my invention, I design the reverse power relay which controls the opening and closing of the network circuit breaker so that when it is deenergized it is biased away from its closing position and also connect the windings of this relay so that when the network circuit breaker is closed the position of the movable element of the relay depends upon the direction of power flow through the circuit breaker and upon the voltage of the feeder circuit and when the circuit breaker is open the relay only moves to its closing position when the feeder circuit voltage exceeds a predetermined value.

My invention will be better understood from the following description when taken in connection with the accompanying drawing which diagrammatically illustrates an alternating current distribution system embodying my invention, and its scope will be pointed out in the appended claims.

Referring to the drawing, 1 is a polyphase network which is arranged to be supplied with energy from a suitable polyphase supply circuit 2 by means of a plurality of feeder circuits 3, only one of which is shown in the drawing in order to simplify the disclosure.

Each feeder circuit includes a stepdown transformer 4, the low voltage secondary winding of which is arranged to be connected to the network 1 by means of a suitable circuit breaker 5, and the primary winding of which is arranged to be connected to the supply circuit 2 by means of a suitable circuit breaker 6. The transformer 4 and secondary circuit breaker 5 are usually located near the network 1, whereas the primary circuit breaker 6 is usually in the main station or substation containing the supply circuit 2.

The circuit breaker 6, which may be of any suitable type, is preferably arranged so that it opens in response to overload conditions in the feeder circuit 3. As shown, the circuit breaker 6 is an overload circuit breaker of the well-known latched in type, and is arranged to be opened by releasing a latch 7 either manually or automatically by means of an overcurrent relay 8 which is connected in series relation with the feeder circuit 3 by means of a current transformer 9. Any suitable means, either manually or automatically controlled, may be provided for closing the circuit breaker 6.

The circuit breaker 5 may also be of any suitable type. As shown in the drawing, the circuit breaker 5 is of the well-known latched in type and includes a closing coil 10 which, when energized, closes the circuit breaker, and a trip coil 11 which, when energized, releases a latch 12 that holds the circuit breaker in its closed position.

In order to effect the opening of the circuit breaker 5 when a fault occurs in the associated transformer 4 or feeder circuit 3, each circuit breaker 5 has associated therewith a relay device 13. As shown, this device is a polyphase power directional relay of the induction disk type and includes a suitably damped movable element such as the shaft 19 which carries a plurality of disks 20, 21, 22. Each of these disks is provided with an electro-magnetic torque producing means or motor element including cooperating current and voltage windings 23, 24 respectively. The current windings 23 of the motor elements are respectively connected to be energized in accordance with the currents in the respective phase conductors of the circuit 3 through suitable means such as current transformers 25, 26, 27. The corresponding voltage windings 24 are connected to be energized in accordance with the voltages to ground of the corresponding phase conductors. In some cases the circuits of the potential windings 24 may include suitable phase displacing means such as resistances 28. If the circuit breaker 5 is closed and the direction of the net power of the circuit 3 is from the feeder to the network 1, the resultant torque of the motor elements is in the direction indicated by the arrow 29 and vice versa for the direction of the net power of the circuit from the network 1 to the feeder 3 as indicated by the arrow 30. For circuit controlling operation, the movable element or shaft 19 carries a contact controlling member 32 which is arranged to control the tripping and closing contacts 33 and 34 respectively in the circuits of the tripping and closing coils 11 and 10. Suitable biasing springs 35 are provided so as to exert on the shaft 19 a torque in the direction indicated by the arrow 30 when the relay is in its closing position, and a torque in the direction indicated by the arrow 29 when the relay is in its opening position. With this arrangement, the member 32 is normally in a neutral position intermediate the normally open contacts 33 and 34 when the relay is deenergized, and a predetermined torque has to be exerted in the direction of the arrow 29 before the contacts 34 are closed, and in the direction of arrow 30 before the contacts 33 are closed.

In order that the amount of reverse power from the network 1 to the feeder 3 required to effect the operation of the relay 13 to its opening position will vary directly with the feeder circuit voltage, I provide an electro-magnetic torque producing or motor element 36 inductively associated with one of the disks, such as 20. The motor element 36 includes two cooperating voltage windings 37 and 38 which are so connected that they exert a torque dependent upon the magnitude of two voltages of the feeder circuit 3 and the phase angle between these two voltages and in the direction of the arrow 29 so that this torque opposes the torque exerted by the current and potential windings 23 and 24 when the circuit breaker 5 is closed and power is flowing from the network 1 to the feeder circuit 3. In accordance with my invention, I permanently connect these two voltage windings 37 and 38 to the proper phase conductors of the feeder circuit 3 so that they continuously exert a torque in the direction of the arrow 29 in proportion to the voltage of the circuit 3. Since the windings 23 and 24 are so connected that they produce no torque when the circuit breaker 5 is open, it will be seen that under this condition of the circuit breaker 5 the torque exerted by the windings 37 and 38 will effect the movement of the relay to its closing position in response to the voltage of the feeder circuit only when this voltage is above a predetermined value.

The operation of the arrangement shown is as follows: Let it be assumed that the parts are in the positions shown and a fault occurs on the feeder circuit 3 so that sufficient current flows through the overcurrent relay 8 to effect the opening of the primary circuit breaker 6. This fault will also cause power to flow through the circuit breaker 5 from the network 1 to the feeder 3. The relay 13 will under these conditions tend to close its contacts 33 if the amount of reverse power is sufficient to overcome the torque produced by the voltage windings 37 and 38. If the relay 13 moves to its opening position so that its contacts 33 are closed, a circuit is completed through auxiliary contacts 14 on circuit breaker 5 for the trip coil 11 which effects the opening of the circuit breaker 5. After the circuit breaker 5 opens, the biasing spring 35 moves the contact controlling member 32 to its neutral position. As soon as the feeder circuit 3 is again reenergized by the closing of circuit breaker 6 and the voltage thereof exceeds a predetermined value which is sufficient to cause the torque exerted by the windings 37 and 38 to overcome the torque exerted by the biasing spring 35, relay 13 will close its contacts 34 and thereby complete through auxiliary contacts 15 on the circuit breaker 5 an energizing circuit for the closing coil 10 to effect the closing of the circuit breaker 5.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an electric circuit, a circuit breaker in said circuit, and means for controlling said circuit breaker including a relay comprising a movable element having a closing position and an opening position, biasing means for maintaining said element out of its closing position when said relay is deenergized, cooperating voltage and current windings connected to said circuit so as to exert only when said circuit breaker is closed an effect on said element in a direction to move it to its closing position under certain conditions of power flow in said circuit and an effect in a direction to move it to its opening position under other conditions of power flow, and voltage responsive means connected to said circuit for continuously exerting on said element as long as said circuit is energized an effect in a direction to move said element to its closing position.

2. In combination, a polyphase feeder circuit, a polyphase network, a circuit breaker connecting said circuit to said network, and means for controlling said circuit breaker including a polyphase relay comprising a movable element having a closing position and an opening position, biasing means for maintaining said element out of its closing position when said relay is deenergized, cooperating voltage and current windings connected to said network and circuit so as to exert only when said circuit breaker is closed an effect on said element in a direction to move it to its closing position when power flows from said circuit to said network and in a direction to move it to its opening position when power flows in the opposite direction, and additional voltage windings connected to said circuit for continuously exerting on said element as long as said circuit is energized in a direction to move said element to its closing position an effect which depends upon the magnitude and phase relation of certain voltages of said circuit.

3. In combination, an electric circuit, a circuit breaker in said circuit, and means for controlling said circuit breaker including a power relay having two sets of normally open contacts, a movable element biased away from one of said sets of contacts when said relay is deenergized, cooperating voltage and current windings connected to said circuit so as to exert only when said circuit breaker is closed an effect on said movable element in a direction to close said one of said sets of contacts under certain conditions of power flow in said circuit and an effect in another direction to close the other set of contacts under other conditions of power flow, and voltage responsive means connected to said circuit for continuously exerting on said element as long as said circuit is energized an effect in the direction to close said one of said sets of contacts whereby the amount of reverse power required to cause said movable element to close said other set of contacts varies with the voltage of said circuit when said circuit breaker is closed and the voltage of said circuit has to exceed a predetermined value in order to cause said element to close said one of said sets of contacts when said circuit breaker is open.

4. In combination, a polyphase circuit, a circuit breaker in said circuit, and means for controlling said circuit breaker including a polyphase relay having two sets of normally open contacts, a movable element biased when said relay is deenergized to a position intermediate said contacts so that both of said sets of contacts are open, cooperating voltage and current windings connected to said circuit so as to exert only when said circuit breaker is closed an effect on said movable element in a direction to close one of said sets of contacts under certain conditions of power flow in said circuit and an effect in the opposite direction to close the other set of contacts under other conditions of power flow, and means independent of said voltage and current windings for continuously exerting on said movable element as long as said circuit is energized an effect in one of said directions whereby the amount of reverse power required to cause said movable element to close one of said contacts varies with the voltage of said circuit when said circuit breaker is closed and the voltage of said circuit has to exceed a predetermined value in order to cause said element to close the other set of contacts when said circuit breaker is open.

5. In combination, an alternating current feeder circuit, an alternating current network, a circuit breaker connecting said circuit to said network, and means for controlling said circuit breaker including a relay having two sets of normally open contacts, a rotatable element biased when said relay is deenergized to a position intermediate said contacts so that both of said contacts are open, cooperating voltage and current windings connected to said circuit and network so as to exert an effect on said element in a direction to close one of said sets of contacts when power flows from said network to said feeder circuit only when said circuit breaker is closed, and means independent of said voltage and current windings for continuously exerting on said element in the direction to close the other of said contacts and as long as said circuit is energized an effect dependent upon voltage of said circuit whereby the amount of reverse power required to cause said element to close said one of said sets of contacts varies with the voltage of said circuit when said circuit breaker is closed and the other of said set of contacts is closed by said element in response to a predetermined voltage of said circuit when said circuit breaker is open.

6. In combination, a polyphase feeder circuit, a polyphase network, a circuit breaker connecting said circuit to said network, and means for controlling said circuit breaker including a polyphase relay having two sets of contacts, a rotatable element biased away from one of said sets of contacts when said relay is deenergized, cooperating voltage and current windings connected to said circuit and network so as to exert an effect on said element in a direction to close the other of said sets of contacts when power flows from said network to said circuit and in a direction to close said one of said sets of contacts when power flows from said circuit to said network only when said circuit breaker is closed, and additional cooperating voltage windings for continuously exerting on said element as long as said circuit is energized an effect dependent upon the magnitude and phase relation of two of said circuit voltages whereby the amount of power required to cause the closure of said other set of contacts varies with the voltage of said circuit when said circuit breaker is closed and the voltage of said circuit has to be above a predetermined value in order to effect the closure of said one set of contacts when said circuit breaker is open.

WILLARD J. McLACHLAN.